(12) United States Patent
Procida

(10) Patent No.: US 6,465,707 B1
(45) Date of Patent: Oct. 15, 2002

(54) METHOD OF TREATMENT OF HALOGENOUS, ORGANIC WASTE MATERIAL

(76) Inventor: Jan Procida, Holmegårdsvej 2, 3th DK-2920, Charlottenlund (DK)

( * ) Notice: Subject to any disclaimer, the term of this patent is extended or adjusted under 35 U.S.C. 154(b) by 0 days.

(21) Appl. No.: 09/805,771

(22) PCT Filed: Oct. 1, 1999

(86) PCT No.: PCT/DK99/00517

§ 371 (c)(1),
(2), (4) Date: Mar. 16, 2001

(87) PCT Pub. No.: WO00/20074

PCT Pub. Date: Apr. 13, 2000

(30) Foreign Application Priority Data

Oct. 2, 1998 (DK) ........................ 1998 01248

(51) Int. Cl.[7] .................................. A62D 3/00
(52) U.S. Cl. ................ 588/206; 588/207; 588/209; 588/213
(58) Field of Search ................ 588/228, 206, 588/207, 208, 209, 213; 405/128.1, 128.15, 128.45, 128.5, 128.7, 128.75

(56) References Cited

U.S. PATENT DOCUMENTS

| 3,826,789 A | 7/1974 | Yokokawa |
| 5,315,055 A | 5/1994 | Butcher, Jr. |
| 5,324,817 A | 6/1994 | Saleh et al. |
| 5,386,055 A | 1/1995 | Lee et al. |
| 5,608,136 A | 3/1997 | Maezawa et al. |
| 5,728,909 A | 3/1998 | Butcher, Jr. |

FOREIGN PATENT DOCUMENTS

| EP | 0 617 984 | 10/1994 |
| WO | WO 98/08880 | 3/1998 |

OTHER PUBLICATIONS

Patent Abstracts of Japan, vol. 1997, No. 5, May 30, 1997, JP 09 012766, Jan. 14, 1997.
Derwent Publications, AN 1976–00973X, JP 50 109991, Aug. 29, 1975.

Primary Examiner—Stanley S. Silverman
Assistant Examiner—Eileen E. Nave
(74) Attorney, Agent, or Firm—Oblon, Spivak, McClelland, Maier & Neustadt, P.C.

(57) ABSTRACT

Halogenous, organic waste material such as PVC is subjected to a hydrolysis treatment by suspending 1 part by weight of the waste material in comminuted state in 1–10 parts by weight of water in the presence of a base and heating this to a temperature of between 250–280° C. at a pressure sufficient to maintain the water in liquid state for a period of time sufficient to convert substantially all organically bound halogen present to inorganic halides. By the treatment valuable halogen-free organic compounds are generated as decomposition products ensuring the economy of the treatment.

12 Claims, No Drawings

METHOD OF TREATMENT OF HALOGENOUS, ORGANIC WASTE MATERIAL

TECHNICAL FIELD

The present invention relates to a method of hydrolytic treatment of halogenous, organic waste material, in particular halogenous plastic waste such as PVC (polyvinyl chloride). By the method the waste material is transformed to different fractions which are all environmentally safe and/or which can be recycled in an environmentally safe manner. Furthermore the treatment is economically advantageous due to the valuable halogen-free organic compounds obtained as decomposition products.

BACKGROUND ART

The disposal of halogenous, organic waste material, including in particular halogenous plastics such as materials containing polyvinyl chloride (PVC), polyvinylidene chloride, polyvinyl fluoride, polyvinylidene fluoride or polytetrafluoroethylene (PTFE), is a difficult task usually causing environmental problems. Thus the combustion of halogenous, organic waste materials results in noxious combustion products. Under unfavourable combustion conditions dioxins, which are very toxic, may be generated, and usually hydrohalic acids, such as HCl, are released which pollute the environment and may cause serious damage to the equipment used due to corrosion.

WO 96/29118 (NKT) discloses a method of dry pyrolysis treatment of PVC-containing material, in which the material in a decomposition step is heated in a reaction zone in a closed system without addition of water to a temperature between 150 and 750° C., preferably 250–350°, in the presence of a halogen-reactive compound selected among alkali metal hydroxides, alkaline earth metal hydroxides, alkali metal carbonates and alkaline earth metal carbonates and mixtures thereof so as to establish a controllable autogenous pressure substantially above atmospheric pressure, in a sufficiently long reaction time to convert essentially all halogen present in the waste material to alkali metal halide or alkaline earth metal halide, said closed system preferably also comprising a condensation zone, where water vapour and volatile compounds liberated from the water material are condensed. The residue obtained in the decomposition step is washed with water, and the soluble and insoluble parts of the residue are separated. By the method the halogen is removed from the waste material without causing uncontrolled emission of hydrohalic acids to the environment. WO 96/29118 does not describe how the pyrolysis can be performed so as to ensure that the decomposition of the chlorine-free part of the PVC molecules results in a high yield of chlorine-free organic compounds which are liquid at normal ambient conditions and which in a conventional manner can be separated to a number of useful desirable products.

U.S. Pat. No. 5,324,817 (Saleh et al.) discloses a process for dehydrochlorinating PVC by heating the PVC in deoxygenated liquid water at temperatures from about 200° C. up to the critical temperature, at which the water can be maintained as a liquid phase. This process is not particularly effective, as only a maximum of about 90% by weight of the chlorine is removed from PVC. The treatment is preferably carried out at a pH up to 7, that is in the acidic range, the use of acid-resistant equipment thus being required. This publication does not either disclose the formation of valuable chlorine-free organic compounds by the decomposition process.

U.S. Pat. No. 5,386,055 (Lee et al.) describes a process for depolymerising polymers by partial oxidation at supercritical or near supercritical conditions for water. By the process the polymer is preferably rapidly brought to a temperature above the critical temperature of water (374° C.) by directly contacting the polymer with supercritical water and thus raising the temperature of the treated mixture substantially instantaneously and eliminating char formation. The treatment is carried out for a period of time ranging from three seconds to about one hour, thus preventing a too drastic decomposition causing formation of $CO_2$ and $H_2O$, the object being to decompose polymers to the original monomers for recycling. Thus, to a certain extent also dimers, trimers and oligomers are produced. If the polymer is PVC, the object of the process is thus to decompose this to vinyl chloride. From the FIGS. 3, 4, 7 and 8 it appears that not only vinyl chloride, but also other low boiling chlorinated hydrocarbons including dichloroethylene, chloroethane, dichloroethane and dichloropropane are prepared. Preparation of valuable halogen-free organic. compounds is not suggested.

U.S. Pat. No. 5,315,055 and U.S. Pat. No. 5,728,909 (Butcher) both disclose a method for depolymerising polymeric material by alkali fusion, wherein a molten reaction mixture is prepared comprising a basic material, a copper source and said polymeric material, and maintaining the molten mixture at a temperature sufficient to reflux said molten mixture for sufficient time to depolymerise said polymeric material. This process is performed at atmospheric pressure and without addition of process water, the process being carried out in a melt. The said patents do not show how to obtain halogen-free decomposition products having a large quantity of valuable organic compounds.

WO 98/08880 (3M) discloses a method of dehydrofluorinating a fluoropolymer whereby an aqueous emulsion of the fluoropolymer is mixed with a basic compound and then heated to 40–100° C. in 3 minutes to 100 hours. The resulting material is described as a dehydrofluorinated fluoropolymer which indicates that the polymer backbone is not decomposed by such treatment below 100° C. Thus the material is in itself a polymer and not a mixture of valuable organic compounds which are liquid at normal ambient conditions.

JP published patent application No. 50,109,991 (Fujikura) discloses treatment of PVC at 160–300° C. in a basic aqueous solution exemplified by heating 22 g PVC, 16 g NaOH, 400 ml water and 5 ml 70% aqueous ethylamine solution at 200° C. in one hour. By this treatment the dechlorinated polymer material will not be decomposed to give a high yield of a mixture of valuable organic compounds which are liquid at normal ambient conditions. U.S. Pat. No. 3,826,789 (Yokokawa) discloses heat treatment of PVC in a basic aqueous solution. The temperature is stated to be from about 180° C. to about 300° C. but according to column 4, lines 6–8, the preferred reaction conditions are heating at 190 to 250° C. in 30 minutes to about 5 hours. Yokokawa does not suggest to adjust the conditions in order to obtain valuable organic compounds which are liquid at normal ambient conditions and which can be recycled. On the contrary the dechlorinated material is burned in a combustion furnace, cf. column 4, lines 34–39.

U.S. Pat. No. 5,608,136 (Maezawa et al.) discloses a method of pyrolytic decomposition of PVC. The treatment is carried out at a relatively high temperature in the range 300 to 600° C. and the dechlorinated pyrolysis product includes heavy compounds which can be condensed by cooling to 200–350° C. and recycled to the pyrolysis step, an oil fraction which is used as fuel and furthermore about 10 parts by weight of a gas which after cleaning in an exhaust gas treatment unit is burned with a burner for post-treatment (column 22, lines 17–20, column 43 and 44, Experiments 98 and 99, and Table 7). Thus both high molecular weight compounds and low molecular weight gaseous compounds occurs in the pyrolysis product which therefore has to be further fractionated and treated.

As appears from the above several approaches have been made to dispose of halogenous, organic waste material such as PVC in an environmentally acceptable manner and an number thereof involves a treatment with heat in the presence of a basic compound and with or without the presence of water. However, although the known methods in a more or less efficient manner can transform the halogen content into environmentally acceptable halides they are both complicated and expensive and not all the reaction products are environmentally safe or can be recycled in an environmentally safe manner.

It has now surprisingly been found that if a hydrolytic treatment of the waste material is carried out within relatively narrow ranges of the reaction conditions the non-halogen residue of waste material can be decomposed to obtain a mixture of valuable and useful halogen-free organic compounds which are easy to handle and separate from the reaction medium and to fractionate into valuable recyclable products because the major part thereof are in the liquid form at normal ambient conditions, that is at ambient temperature (for example 10–30° C.) and atmospheric pressure.

Accordingly, the object of the present invention is to provide a method of treatment of halogenous, organic waste material, in which the waste material is transformed to different fractions which are all environmentally safe or can be recycled in an environmentally safe manner, in which the halogen content in the waste material is efficiently transformed to inorganic halides the formed hydrohalic acids being neutralised with a base and in which the economy of the method can be ensured on the basis of valuable halogen-free organic compounds obtained as decomposition products.

BRIEF DESCRIPTION OF THE INVENTION

This object is achieved by the method according to the invention for hydrolytic treatment of halogenous, organic waste material, in which 1 part by weight of the waste material being suspended in comminuted state in 1–10 parts by weight of an aqueous medium in the presence of a base is heated to a temperature between 250–280° C. at a pressure sufficient to maintain the water in liquid state for a period of time sufficient to convert substantially all the organically bound halogen present to inorganic halides.

By maintaining the hydrolytic treatment under the above conditions according to the invention a surprisingly high amount of the organic part of the PVC-molecules are not only freed from the toxic halogen but also transformed into organic compounds which are easy to handle and recover as valuable compounds and/or compositions due to the surprising finding that almost all the halogen-free organic compounds obtained are liquid at normal ambient conditions.

A useful embodiment of the present invention for the recovery of said valuable halogen-free organic compounds involves the treatment of halogenous, organic waste material to decompose said halogenous, organic waste material comprising the steps of (I) hydrolytic heating a suspension of 1 part by weight of the waste material in comminuted state in 1–10 parts by weight of an aqueous medium in the presence of a base to a temperature between 250–280° C. at a pressure sufficient to maintain the water in liquid state for a period of time sufficient to convert substantially all the organically bound halogen present to inorganic halides, (II) separation of the hydrolysed material (i.e. the hydrolysate) obtained in step (I) into a solid phase and a liquid phase, (III) post-heating the solid phase of the hydrolysate obtained in step (II) to liberate organic compounds having melting point below room temperature and boiling point above room temperature from said solid phase.

The extent of applicability of the invention appears from the following detailed description. It should, however, be understood that the detailed description and the specific examples are merely included to illustrate the preferred embodiments, and that various alterations and modifications within the scope of protection will be obvious to persons skilled in the art on the basis of the detailed description.

DETAILED DESCRIPTION OF THE INVENTION

The present invention is based on the idea that a basic hydrolysis is used to remove halogen from organic waste material, in particular and here exemplified by the removal of chlorine from PVC, while generating inorganic halides such as sodium chloride.

Besides the necessary heat energy also the consumption of the base is a substantial cost of the process. It is thus vital in the method according to the invention not only to ensure that the halogen is bound in an environmentally safe manner in form of halide salts, but also—as the special feature of the present invention—that the remaining part of the PVC molecules is transformed to valuable organic compounds, which are easy to handle and separate into a number of high value compounds and products.

This feature is obtained by the present invention due to the surprising fact that almost all the halogen-free organic substances—which can be obtained and isolated from the hydrolysate resulting from the treatment—has such a molecular weight that the compounds are in the liquid state at normal ambient conditions. Thus an organic halogen-free fraction is obtainable, which fraction surprisingly is free of compounds which are in the gaseous state at normal ambient conditions and only a very small portion is solid at normal ambient conditions.

Said solids will be present in a residue of carbon and some inorganic compounds including heavy metals and also this residue can be recycled in an environmentally safe way such as by the Carbogrit process or as a useful ingredient for the preparation of mineral wool. In the Carbogrit process the waste water sludge is composted, melted in a rotary furnace, granulated by quenching and pulverised to obtain a sand-blasting material.

In comparison with the known methods involving hydrolysis or pyrolysis of halogenous organic waste materials such as PVC the present method is superior due to the fact that no organic materials have to be combusted which would lead to pollution of the atmosphere and none of the resulting materials have to be deposited at a waste disposal site.

By the method according to the invention the halogenous, organic waste material is treated in comminuted state, usually in a particle size of maximum 5 mm, preferably max. 3 mm such as about 1–2 mm. The material is suspended in water while being stirred vigorously. The amount of water used must be sufficient to maintain the NaOH present as well as the formed NaCl in dissolved state during the entire treatment process. Thus at least 1 part by weight, preferably at least 2 parts by weight and usually 4–10 parts by weight, most preferred 5 to 7 parts by weight such as about 6 parts by weight of water is used per 1 part by weight of waste material. The treatment is performed at a pressure, preferably an autogenous pressure, sufficient to maintain the water in liquid state.

To ensure a sufficient decomposition the hydrolysis temperature should be at least 250° C. On the other hand higher temperatures such as 300° C. would lead to a strong pyrolysis giving both a further degree of decomposition resulting in gaseous materials and a higher amount of the residue comprising more solids including elementary carbon. Thus, such higher temperatures gives a lesser amount of the valuable halogen-free organic compounds which are liquid at normal ambient conditions.

Therefore the hydrolytic treatment of the present invention should be carried out at a temperature not higher than 280° C., preferably at 255–265° C.

The hydrolytic treatment time is to be sufficient to ensure complete dehalogenation of the organic components and is usually at least 30 min., preferably at least 45 minutes. Usually a hydrolytic treatment of a duration of 5 hours, preferably maximum about 2 hours, is sufficient. Preferably a hydrolytic treatment time of between 50 and 90 minutes, such as about 1 hour is adequate.

In order to avoid oxidising conditions during the treatment, it is advantageous to blow an inert gas through the material prior to initiation of the treatment. If present in the hydrolysis reactor oxygen may cause some of the C—H-groups of the polymer to react with the oxygen under the formation of carbon dioxide, thus preventing these C—H-groups to be exploited as useful and valuable chlorine-free organic compounds. The inert gas used may for example be nitrogen or carbon dioxide or other inert gases or mixtures thereof.

The selection of the base used is not critical to the invention, but for economic reasons the base is usually chosen from among alkali metal hydroxide or alkaline earth metal hydroxide, for example sodium hydroxide, potassium hydroxide or calcium hydroxide, in particular sodium hydroxide or calcium hydroxide. The base may be used in pure form or in form of a mixture. By the use of a hydroxide as the base the major or entire amount of the hydroxide groups—which are liberated by the reaction with the hydrohalic acids resulting from the hydrolysis—will be bound to the organic compounds present in the reactor. In this way a substantial portion of the liquid valuable organic compounds obtained by the hydrolytic treatment will be specially valuable alcohols.

Examples of alcohols which can be formed by the method according to the invention are: n-butanol, benzyl alcohol, α-methyl benzyl alcohol and various octanols including 2-ethylhexanol. Some of the aromatic alcohols are assumed to originate from plasticizers, as it is obvious for a person skilled in the art that plasticizers are hydrolysed into alcohols or the like compounds under the conditions of the method and thus in any circumstances are converted and isolated in an environmentally innoxious manner. However, aromatic alcohols have also been observed when processing pure PVC, that is PVC containing no plasticizer. Accordingly it is assumed that hydrolysis of the long carbon chains generates short chained molecules which are cyclized and dehydrogenated into aromatic compounds.

The amount of base used is to be sufficient to ensure that the halogen content in the waste material, which is hydrolysed to hydrogen halide, will be neutralised to water soluble halide salts. Thus at least one mole-equivalent of base relative to halogen, preferably a small excess is used. The typical amount of base is between 1 and 2 mole-equivalents, preferably between 1 and 1.3 mole-equivalents, more preferred 1.05 to 1.15 such as about 1.1 mole-equivalents.

When determining the amount of base necessary the purity of the halogenous, organic waste material to be treated is of course also to be taken into consideration. Typical PVC-containing waste materials ordinarily contain 40–60% by weight of PVC, for example about 50% by weight.

After the hydrolytic treatment the hydrolysate obtained can be separated into some valuable useful raw materials and products and environmentally harmless materials in a simple and easy manner using well known physical and/or chemical methods. Thus the hydrolysate is first separated into a liquid aqueous solution and a solid phase by a conventional separation method, preferably conventional filtration. The obtained two phases of the hydrolysate can also be termed the liquid hydrolysate phase and the solid hydrolysate phase, respectively. The solid hydrolysate phase is usually in the form of relatively large particles which are easy to separate form the liquid hydrolysate phase by filtration.

The solid hydrolysate phase, preferably in the form of the wet filter cake obtained by a conventional filtration of the hydrolysate, can easily be processed by a post-heating, preferably at ambient pressure, whereby various organic compounds are liberated, probably after a minor degree of decomposition of the largest molecules.

Preferably the wet filter cake to be treated in the post-heating step will typically be present with a substantial amount of the liquid hydrolysate phase adhering to the solid hydrolysate phase such as a liquid to solid ratio of from 0.5:1 to 2:1, especially about 1:1.

By the post-heating this wet filter cake is heated at substantially atmospheric pressure at a gradually increasing temperature up to an end temperature of 450–600° C. in a reactor provided with an outlet at the top leading to a condenser connected with a receiver. Preferably said reactor is a conventional distilling equipment.

The gradually heating of the wet filter cake can be carried out by constant supply of heat energy heating the material until it reaches at temperature of 450–600° C. within from 30 minutes to 2 hours, preferably from 45 minutes to 90 minutes, for example in about one hour. During this post-heating a number of valuable halogen-free organic compounds are liberated from the solid hydrolysate phase by sublimation and/or evaporation and collected in the receiver after cooling.

This post-heating is in other words carried out as a conventional distillation. It is however believed that the heating rate is of some importance and that it should not be too high since some of the compounds probably are bound to each other either chemically or physically such as by absorption or adsorption and thus have to be desorbed and/or further decomposed. However, it is believed that the first heating period up to 100° C. does not require such slower heating rate.

The exact composition of the solid hydrolysate phase as it is obtained after the hydrolysis and filtration is not known yet, but the important and surprising finding is that the post-heating of this solid hydrolysate phase at atmospheric pressure carried out essentially as a conventional distillation leads to a very high yield of halogen-free organic compounds, which when some water soluble organic compounds, which can be recovered from the liquid hydrolysate phase is included, gives a total yield of halogen-free organic compounds being very close to the quantitative yield of the non-halogen part of the PVC-molecules. As a further surprising advantage the essential portion of these organic compounds—some of which may be used as mixtures—are valuable and easy to handle as they are liquid at normal ambient conditions.

By the experiments made to evaluate the present invention the halogen-free fraction of valuable organic compounds has been obtained as a mixture of several compounds in order to demonstrate that a very high yield of such compounds are obtained calculated in relation to the theoretically obtainable yield of halogen-free hydrocarbon residue of the PVC-molecules. When carrying out the inventive process in practice well known methods can be used to separate the obtained mixture of organic compounds into the pure compounds and/or useful commercial mixtures including but not limited to commercial solvents and anti-knocking agents (i.e. agents increasing the octane number).

After the post-heating of the wet filter cake with evaporation and in some cases probably also with sublimation of the valuable organic compounds a residue is left in the reactor. This residue will comprise some inorganic compounds including heavy metal compounds and also a minor amount of carbon. This residue can be used in an environmental safe manner for example in the so-called Carbogrit process, in which residue—alone or together with a composted waste water sludge obtained by the post-treatment of the liquid hydrolysate phase as further described below—is melted in a rotary furnace, granulated by quenching and pulverised to obtain a sand-blasting material. Another example is the use of the residue and/or the waste water sludge as an ingredient by the preparation of mineral wool. By the preparation of mineral wool a certain proportion of heavy metals is required—in some cases they are already present in the raw materials used, but in other cases addition of heavy metals is necessary and here the residue from the post-heating and/or the sludge can be utilized and disposed of in the same time.

In some cases the heavy metals can be present in the residue and/or the sludge in relative high concentration in which case the heavy metal can be recovered as such in an economical attractive manner.

The liquid hydrolysate phase in form of the filtrate obtained by the filtration of the hydrolysed material which is a liquid aqueous phase wherein the inorganic halogen compounds such as sodium chloride or calcium chloride are dissolved will also comprise some water soluble alcohols. Such alcohols are valuable and can be isolated by means well known to the person skilled in chemistry. The remaining part of the liquid hydrolysate phase can be further processed in an environmentally safe manner. Further details will appear below in the general procedure.

General Procedure

The procedure described below is a general embodiment of the invention for treatment of 1000 kg mixed PVC waste material.

Treatment of PVC Waste Prior to the Hydrolysis

A representative mixture of products containing PVC typically comprises PVC tubes, cable refuse, artificial leather, plastic films, car parts, floor coverings, toys, disposable articles and the like. The waste material is sorted and cleaned manually by washing off any extraneous matter such as gravel and soil. Furthermore metal is removed. If possible, it is advantageous also to remove other types of plastic. Such plastic types are not harmful to the process, but it is considered environmentally as well as economically unsound to carry out an alkaline hydrolysis of non-halogenous plastic types.

The sorted and cleaned PVC waste, which typically contains 40–60% by weight of PVC, is granulated to a particle size of maximum 3 mm and suspended in 5,000 to 10,000 kg of water, for example about 6,000 kg of water. PVC waste usually has a higher specific gravity than water and it is thus possible to remove a fraction of non-PVC-containing material by skimming this off the suspension.

To the suspension being stirred in a mixing tank a small excess of sodium hydroxide is added, for example instance 1.1–2.0 of mole-equivalent of sodium hydroxide relative to the assumed chlorine content of the PVC waste, for example in form of about 1,500 kg of 27.7% NaOH.

Hydrolysis

The suspension is transferred to a closed pressure tank and heated to 250–280° C., typically about 260° C., for about 30 minutes to 5 hours, typically about 1 hour. The operation pressure is typically 5–9 MPa (50–90 bar).

Separation (Filtration)

Upon completion of the hydrolysis treatment, the material (the hydrolysate) is separated into a liquid fraction and a solid fraction, preferably by filtration. This filtration is preferably carried out by means of a coarse filter retaining material with a particle size above 0.01 mm.

The filtration is preferably carried out while maintaining the operation pressure of 5–9 MPa.

Post-heating

The filter cake is then post-heated at ambient pressure at gradually increasing temperature reaching an end temperature of 450–600° C. in the reactor. The increase of the temperature should not be too fast. Typically the end temperature is not reached before a post-heating period of about one hour. Preferably the filter cake is wet as experiments where the filter cake had been dried before the post-heating gave a lesser yield of the valuable halogen-free liquid organic compounds. Typically the wet filter cake should have a moisture content of about 50% by weight prior to the post-heating.

Preferably the post-heating is carried out as a conventional distilling process in a conventional distilling equipment. The valuable halogen-free liquid organic compounds are obtained as the distillate and separated into pure compounds and/or commercial mixtures partly during the distilling process and partly by further well known separation and purification techniques.

Residue from the Post-heating

The residue in the reactor after the post-heating contains carbon and some inorganic matter including heavy metal compounds and NaCl and NaOH. This residue may be processed alone or combined with other fractions containing heavy metals, such as fractions obtained by the purification of the aqueous hydrolysis filtrate as further described below.

Liquid Hydrolysate Phase

The liquid hydrolysate phase obtained by the filtration, i.e. the filtrate, comprises water, alcohols, ammonia (which may originate from flooring having a hessian back and from other organic materials in the waste), salts from heavy metals and sodium chloride and any excessive sodium hydroxide. The inherent alcohols may be isolated in the following manner.

The filtrate is fed through a pressure reducing valve, in which the pressure is reduced from the working pressure to about 0.2–0.5 MPa (2–5 bar) and into a first flash tank, in which water, alcohols and ammonia evaporate spontaneously and are separated from a solid-containing residue comprising gypsum and other inorganic materials including sodium chloride, sodium hydroxide and compounds containing heavy metals. The vaporous phase obtained in the first flash tank is fed through a heat exchanger and cooled prior to being led though a pressure-reducing valve and into a second flash tank. The temperature before the second flash tank is slightly above the boiling point of water at the pressure in the second flash tank, but below the boiling point of the lowest-boiling of the alcohols present. The temperature thus ranges typically from between 100 and 116° C., for example about 105° C., if atmospheric pressure is maintained in the second flash tank. In an alternative embodiment a vacuum is provided in the second flash tank. In the second flash tank water containing the ammonia present is evaporated, while alcohols and other useful organic compounds are left as residue from which they can be purified by conventional purification methods such as fractional distillation, preparative chromatography and the like.

The residue from the first flash tank and the water fraction distilled off from the second flash tank may be disposed of in an environmentally safe manner known per se. The residue from the first flash tank may for instance be transferred to a mixing tank and washed with water. It is advantageous to use the distillate from the second flash tank as water, said distillate also containing alcohol and ammonia residues. In this washing process salts including the majority of the heavy metal compounds are redissolved. Subsequent to being washed in the mixing tank, any undissolved material is filtered off and optionally mixed with water and led through a biological waste water treatment plant, where any remaining amounts of COD (chemical oxygen demand) may be decomposed.

The filtrate from the mixing tank is fed to a heavy metal precipitation plant, in which the heavy metals dissolved as salts are precipitated by means of for instance NaS or NaOH or in a corresponding conventional manner. The precipitation of heavy metals is performed in a very advantageous manner, the amount of solids present in the filtrate prior to the precipitation being very small. Accordingly, a sludge cake containing heavy metal is precipitated having such a high concentration of heavy metals that the sludge cake can be processed for the extraction of heavy metals which thus can be recycled. After precipitation the process water used may be led to a biological waste water treatment plant or be reintroduced into the process.

In the biological waste water treatment plant remaining organic substances are decomposed and inorganic substances are precipitated with a biological waste water sludge. The sludge may be dehydrated and reduced to vegetable mould and thus used for different purposes. An example of an environmentally advantageous disposal method of waste water sludge is the so-called Carbogrit process, in which the waste water sludge is composted, melted in a rotary furnace, granulated by quenching and pulverised to obtain a sandblasting material.

EXAMPLE 1
(Hydrolysis)

For the experiments use was made of a standard PVC waste provided by The European Council of Vinyl Manufacturers, ECVM, consisting of a mixture of commercial PVC products including wire insulation and others and comprising fillers, colourings, plasticizers etc. and also other plast types. The ECVM standard contains 40.7% by weight of PVC, 29.6% by weight of plasticizers, the balance being fillers and other minor components. Its TOC (total organic carbon) has been determined to 41.1 g per 100 g. The standard PVC waste is provided in comminuted state with a maximum particle size of 2–3 mm. This standard composition resembles the PVC waste typically found in PVC processing plants and is used for comparison of the different experiments being carried out in Europe.

100 g of the standard ECVM PVC waste, 500 g water and 100 ml of a 27,7% NaOH solution were heated to up 270° C. within 30 minutes under oxygen-free conditions (purging with nitrogen) in a laboratory autoclave provided with a magnetic stirrer and kept at this temperature for further 60 minutes. After cooling to ambient temperature the content of the autoclave was filtered; the autoclave was rinsed with 600 ml water. Hereby 1.02 kg filtrate and a porous, yellow/grey filter cake were obtained. The wet filter cake had a weight of 191.8 g.

EXAMPLE 2
(Hydrolysis)

Under similar conditions as in example 1 100 g of the standard PVC waste, 600 g water and 100 ml of a 27,7% NaOH solution were heated up to 250 ° C. in the autoclave within 30 minutes and kept at this temperature for further 60 minutes. After cooling to ambient temperature the content of the autoclave was filtered; the autoclave was rinsed with 500 ml water. The yield was 0.94 kg filtrate and 182.5 g of a wet porous, yellow/grey filter cake.

EXAMPLE 3

A number of laboratory tests have been carried out under conditions corresponding to the above general procedure for the hydrolysis step followed by an extraction of the liquid hydrolysate phase.

Tests 1 and 2 were performed with raw PVC without plasticizer to show that the alcohols formed do not originate from plasticizers.

Tests 3, 4 and 5 were performed with authentic PVC waste samples of a partially unknown composition.

The test conditions and results appears from the following table

| Test No. | PVC | Water (ml) | NaOH 27.7% (ml) | Time (min) | Temp. (° C.) | Alcohol total[1] (g) | Organic chlorine |
|---|---|---|---|---|---|---|---|
| 1 | 100 g raw | 700 | 300 | 60 | 280 | 2–4 | none |
| 2 | 100 g raw | 700 | 300 | 805 | 265 | 2–4 | none |
| 3 | 100 g waste material | 600 | 200 | 50 | 240 | 4–7 | none |
| 4 | 100 g waste material | 600 | 200 | 130 | 265 | 4–8 | none |
| 5 | 100 g waste material | 600 | 200 | 65 | 280 | 4–8 | none |

[1] In the tests part of the alcohol was adsorbed on the solid phase.

By extraction from the liquid hydrolysate phase obtained in test 1 the presence of n-butanol, benzyl alcohol, a-methyl benzyl alcohol and 2-methyl benzyl alcohol was detected. Test 2 revealed the presence of n-butanol, but not of the three latter alcohols.

By extraction from the liquid phase obtained in tests 3, 4 and 5 the presence of n-butanol and various octanols including 2-ethylhexanol and minor amounts of benzyl alcohol and α-methyl benzyl alcohol was detected.

An infrared spectroscopy analysis (FTIR) of a sample of the material from test No. 1 was performed, partly on the extracted material (A) and partly on a methylene chloride extract (B).

A (cm$^{-1}$): 3440 (—OH), 3019 (—CH—, aromatic ring), 2925 (—CH$_2$—, aliphatic), 2858 (—CH$_2$—aliphatic), 1696 (may originate from an organic acid group), 1635 (may originate from cyclization), 1568 (may originate from the backbone of a benzene ring) , 1448 (—CH$_2$—, aliphatic), 1380 (—CH$_3$), 1065 (may be C—O from ether), 964 (aliphatic double bond, trans) and 702 (benzene ring).

B (cm$^{-1}$): 3440 (—OH), 3060–3020 (—CH—, from aromatic ring), 2960 (—CH$_3$), 2925 (—CH$_2$—, aliphatic), 2860 (—CH$_2$—, aliphatic), 1703 (may originate from organic acid groups), 1602 (benzene ring), 1455 (—CH$_2$—), 1374 (—CH$_3$—), 970 (aliphatic double bond) and 702 (benzene ring).

EXAMPLE 4
(Post-Heating)

The wet filter cakes from Example 1 and Example 2 were combined. The combined wet filter cake (321,6 g corresponding to 146 g dry matter according to analysis) was heated gradually under oxygen-free conditions within a period of one hour to an end temperature of ca. 550–600° C. at atmospheric pressure in a reactor equipped with a cooling condenser, which was fitted with a receiving container. The first heating period up to 100° C. need not to be carried out slowly, but thereafter relatively slow heating is required. At about 360° C. a decrease of the temperature occurred indicating that remaining polymeric compounds were cracked. Two immiscible phases were obtained in the receiving container; a water phase and a viscous, organic phase. At the end of the heat treatment, a residue remained in the reactor. The two liquid phases were separated and 168.2 g water phase and 66,3 g viscous organic phase were obtained.

The residue (79.7 g), which remained in the reactor after post-heating of the yellow filter cake obtained from the hydrolysis contained 32.1 g of carbon, 7.0 g of NaCl and 40.6 g of other inorganic matter.

The water phase obtained after the post-heating was analysed and was found to contain 17,4 g water soluble organic matter including a number of valuable alkohols.

Thus, the total amount of chlorine-free liquid organic compounds obtained from the combined filter cakes is 17,4 g+66,3 g=83,7 g.

EXAMPLE 5
(Hydrolysis+Post-heating)

Under similar conditions as in example 1 14 runs were carried out each time using 100 g of the standard ECVM PVC waste, 500 g water and 100 ml of a 27,7% NaOH solution, which were heated up to 260 ° C. in the autoclave within 30 minutes and kept at this temperature for further 60 minutes. After cooling to ambient temperature the content of the autoclave was filtered and rinsed with 500 ml water to obtain from 0.907 to 1.030 kg filtrate (average 0.991 kg) and a porous, yellow/grey filter cake in the form of from 152.3 to 195.2 g of wet filter cake (average 166.0 g).

7 portions of wet filter cake each made by pooling two of the 14 filter cakes obtained above were prepared and 7 runs of post-heating treatments of these pooled portions were carried out similar to example 4. These runs gave totally 1376 g of water phase, 369 g organic phase and 453.6 g residue.

These 1376 g of water phase was pooled with the 14 filtrates obtained by the above runs of hydrolysis. This aqueous portion, which did not contain detectable organic halogen compounds, contained 169.4 g of halogen-free organic compounds.

Neither did the obtained organic phase contain any detectable organic halogen compounds. Thus the total amount of valuable halogen-free organic compounds obtained from 1400 g PVC waste containing 40.7% by weight of PVC, i.e. 569.8 g, was 538.4 g. Of course a part of this yield is likely to originate from plasticizers.

According to a chemical analysis the residue contained about 15% by weight of $SiO_2$, 55.6% by weight of CaO, 9.5% by weight of $TiO_2$, 4.7% by weight loss on ignition (950° C.; carbonised organic compounds) the balance being minor amounts of other inorganic compounds. The major components of the residue appears to be lime, quarts, talc and kaolin originating from fillers. This residue is considered as very useful as starting material for the Carbogrit production or other melting processes.

Based on TOC (total organic carbon) analysis following mass balance can be made:

|  | TOC g |
|---|---|
| PVC waste | 41.1 |
| combined water phases | 6.2 |
| organic phase | 19.2 |
| residue | 9.8 |
| $CO_2$ | 0.2 |
| loss | 5.7 |

Yield of valuable halogen-free liquid organic compounds which can be recovered:

$$100\times(6.2+19.2)/41.1=61.8\%$$

It should be noted that the runs according to the present example were carried out under laboratory conditions with inevitable loss of material; for example a recognised loss occurred when the wet filter cakes were transferred from the filter paper to the post-heating reactor. When the method has been further optimized in connection with future scaling-up work a far lower loss is contemplated.

Following halogen-free organic compounds were found in the combined water phases and the organic phase:

| compound | water phases amount (mg) | organic phase amount (mg) | total (mg) |
|---|---|---|---|
| $C_{1-2}$ alkanoic acid | 1489 | not analysed | 1489 |
| aromatic acids | 6880 | not analysed | 6880 |
| $C_{1-4}$ alkanols | 554 | not analysed | 554 |
| $C_{3-4}$ ketones | 223 | not analysed | 223 |
| aromatic hydrocarbons | 19 | 33365 | 33384 |
| styrene | 1,6 | 16811 | 16813 |
| benzaldehyde | 8,8 | 0 | 8,8 |
| 2-ethylhexanol | 84 | 14225 | 14309 |
| benzylalkohol | 48 | 0 | 48 |
| phenols | 221 | 2500 | 2721 |
| others (GC-MS) | 165 | 60350 | 60515 |
| others (GC-FID) | not analysed | 317271 | 317271 |

GC-MS: Gas chromatography - mass spectrometry
GC-FID: Gas chromatography - flame ionization detector The above description of the invention reveals that it is obvious that it can be varied in many ways. Such variations are not to be considered a deviation from the scope of the invention, and all such modifications which are obvious to persons skilled in the art are also to be considered comprised by the scope of the succeeding claims.

What is claimed is:

1. A method of treatment of halogenous, organic waste material to decompose said halogenous, organic waste material comprising the steps of
   (I) hydrolytic heating a suspension of 1 part by weight of the waste material in comminuted state in 1–10 parts by weight of an aqueous medium in the presence of a base to a temperature between 250–280° C. at a pressure sufficient to maintain the water in liquid state for a period of time sufficient to convert substantially all the organically bound halogen present to inorganic halides,
   (II) separation of the hydrolysate obtained in step (I) into a solid phase and a liquid phase,
   (III) post-heating the solid phase of the hydrolysate obtained in step (II) to liberate organic compounds having a melting point below room temperature and a boiling point above room temperature from said solid phase.

2. A method according to claim 1, wherein the aqueous medium in step (I) contains 1–3, preferably 1.1–2.0 mole-equivalents of base relative to halogen in the halogenous, organic waste material.

3. A method according to claim 1, wherein the hydrolytic heating in step (I) is carried out for a period of time between 30 minutes and 5 hours.

4. A method according to claim 3, wherein the hydrolytic heating is carried out for a period of time between 50 minutes and 90 minutes.

5. A method according to claim 1, wherein an alkali metal hydroxide, alkaline earth metal hydroxide or a mixture thereof is used as the base.

6. A method according to claim 1, wherein step (III) is carried out by post-heating the solid phase of the hydrolysate from step (II) at substantially atmospheric pressure at a gradually increasing temperature up to an end temperature of 450–600° C.

7. A method according to claim 1, wherein the solid phase of the hydrolystate from step (II) is a wet filter cake having a moisture content of 20–60% by weight.

8. A method according to claim 1, wherein the post-heating step (III) is carried out in a reactor provided with an outlet at the top leading to a condenser connected with a receiver.

9. A method according to claim 1, wherein the post-heating step (III) is carried out with simultaneous fractionation of the liberated organic compounds.

10. A method according to claim 1, wherein the hydrolytic step (I) is carried out under oxygen-free conditions.

11. A method according to claim 1, wherein the post-heating step (III) is carried out under oxygen-free conditions.

12. A method according to claim 1, wherein the waste material is PVC.

* * * * *